United States Patent [19]
Verhoeven et al.

[11] 3,806,745
[45] Apr. 23, 1974

[54] SLIP RING

[75] Inventors: Pierre Verhoeven, Bruxelles; Jean A. F. Sunen, Waterloo; Henry R. P. J. Schoumaker, Bruxelles, all of Belgium

[73] Assignee: La Soudure Electrique Autogene, Procedes Arcos, Anderlecht, Belgium

[22] Filed: Aug. 11, 1972

[21] Appl. No.: 279,865

[30] Foreign Application Priority Data
Dec. 31, 1971  Belgium .............................. 777589
Dec. 31, 1971  Belgium .............................. 779116
Dec. 31, 1971  Belgium .............................. 779117

[52] U.S. Cl. .............................. 310/227, 310/232
[51] Int. Cl. .............................. H02k 9/28
[58] Field of Search ............ 310/232, 219, 52, 178, 310/54, 67, 58, 227, 243

[56] References Cited
UNITED STATES PATENTS
3,191,082  6/1965  Csillag .............................. 310/219
3,601,643  8/1971  Krulls .............................. 310/219
3,444,408  5/1969  Krulls .............................. 310/178
3,514,653  5/1970  Kendall .............................. 310/178
3,312,843  4/1967  Krulls .............................. 310/178
3,436,575  4/1969  Harvey .............................. 310/178
3,681,633  8/1972  McNab .............................. 310/178

Primary Examiner—R. Skudy
Attorney, Agent, or Firm—Jackson, Jackson & Chovanes

[57] ABSTRACT

In an electric contact or the like, there are provided inner and outer metallic members carrying electricity, the inner intended to act as an axle or hub for the outer, and one of which is moving and the other stationary. Connecting them together and conducting electricity is a content of molten metal or alloy, typically mercury, an alkali metal or the like. The heat development is carried off by artificial cooling by conducting a liquid or gas through cooling passages.

5 Claims, 18 Drawing Figures

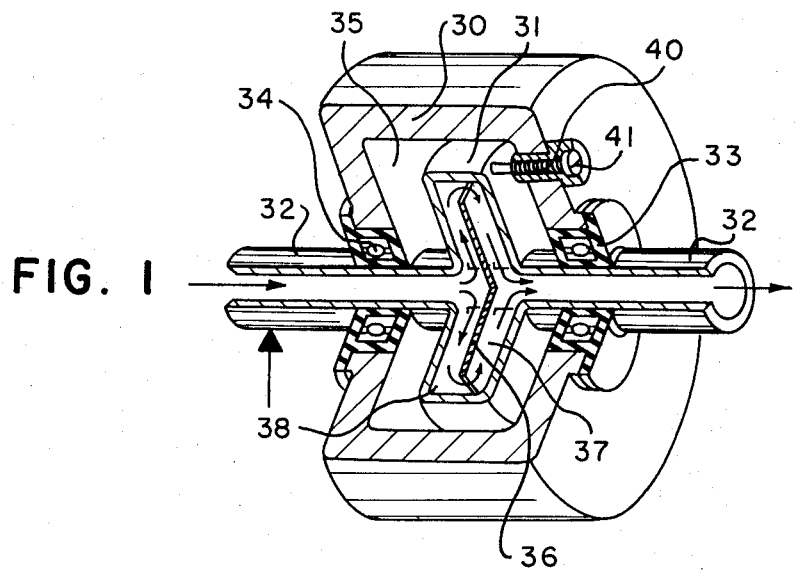
FIG. 1
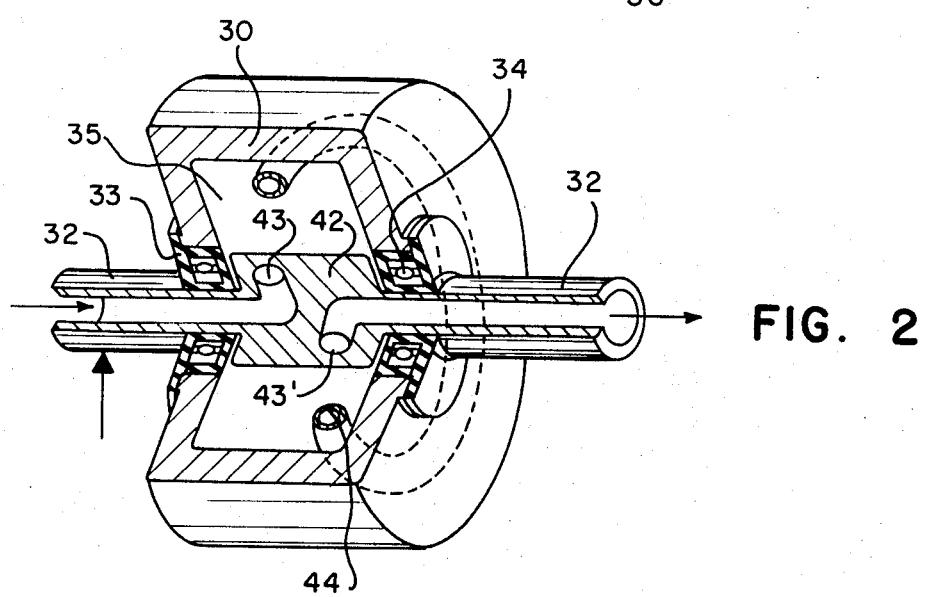
FIG. 2
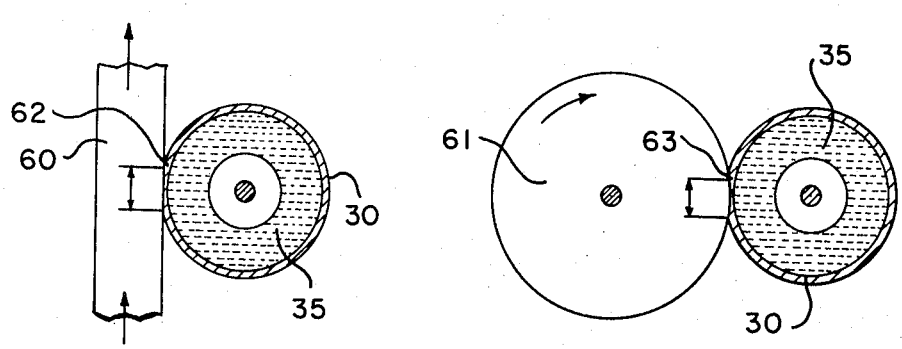
FIG. 7
FIG. 8

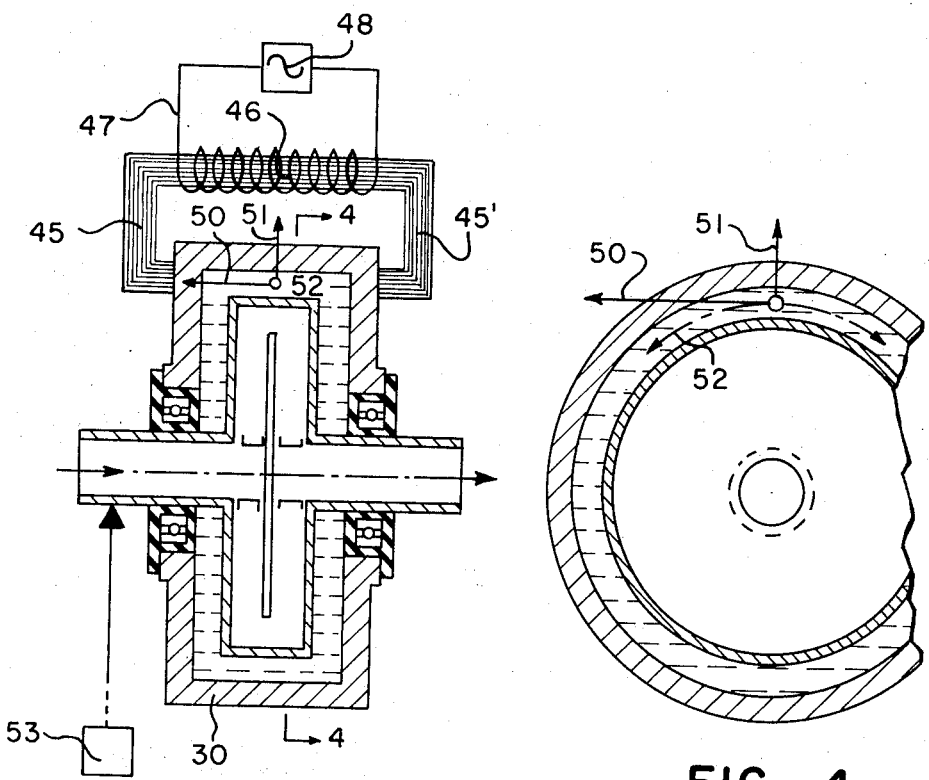
FIG. 3
FIG. 4
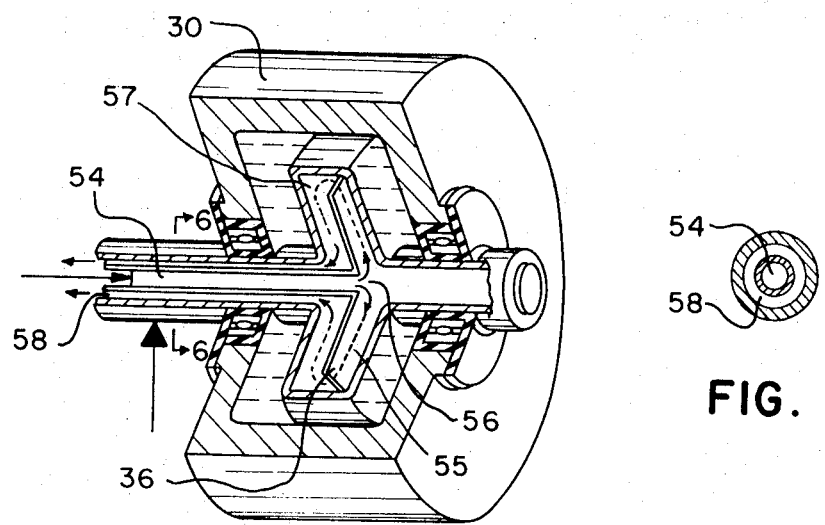
FIG. 5
FIG. 6

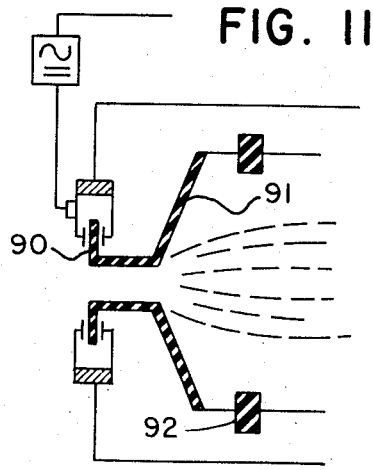
FIG. 11
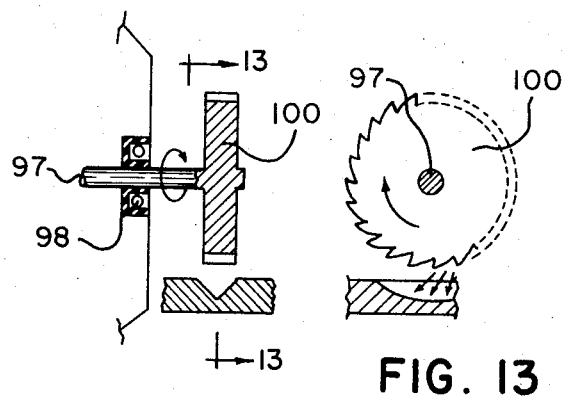
FIG. 14
FIG. 13
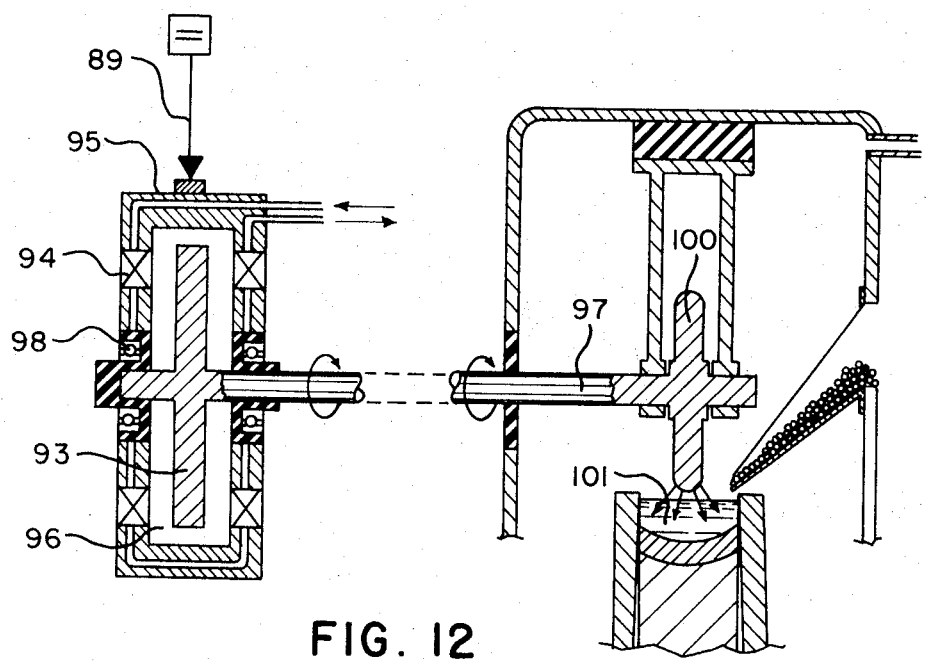
FIG. 12

3,806,745

SLIP RING

DISCLOSURE OF THE INVENTION

Our invention relates to means for conducting electricity between stationary contacts and movable contacts.

Among the numerous known means for transmitting electric current from a fixed contact to a moving contact or vice versa, the simplest are those which consist of a slip ring comprising a roller integral with one of the parts, which is put into contact with the other part under a certain pressure. If necessary, that pressure may be regulated by elastic means.

The fields in which electric current is transmitted are for instance those of electric traction, which utilize an arm and a contact wheel (trolley) to pass the electric current to the vehicle to which the arm is connected. Unfortunately these arrangements are far from being free from drawbacks. Owing to friction on the parts they heat up and undergo plastic deformation and are quickly worn out by erosion. These drawbacks are particularly serious at high speeds and high amperages, owing to vibrations, breaks in contact, and sparks produced as a result of the amplitude and frequency of the oscillatory movements of the vehicle or the mobile element as it undergoes movement. At high speeds elastic means for regulating the pressure when they are present, are not without inertia and they have not sufficient sensitivity to absorb the inertia reactions promptly enough.

The present invention contributes a radical remedy to these drawbacks. It consists of a process for transmitting electric current between a stationary element and a movable element or vice versa, characterized by the fact that the transmission is ensured by means which maintain contact between the parts without friction and with maximum flexibility. This means consists in a device which has an electroconductive liquid interposed between the mobile part and a fixed part.

The figures are accompanied by the present description and are illustrative only of some of the numerous forms of implementation of the device in accordance with the present invention, which clearly shows the objects of the invention and its numerous advantages.

In the various figures elements which are identical or similar are identified by the same reference numbers.

FIG. 1 is a perspective of the invention in axial section.

FIG. 2 is a perspective of another form of the invention, in axial section.

FIG. 3 is a radial section of a form having an auxiliary device connected to the device of the invention.

FIG. 4 is a partial transverse section of FIG. 3.

FIG. 5 is a perspective of another form of implementation of the invention in axial section.

FIG. 6 is a partial transverse section on the line 6—6 of the device according to FIG. 5.

FIG. 7 is a plan of another example in transverse section of the utilization of a slip ring according to the invention.

FIG. 8 is a plan of still another example of the slip ring according to the invention, in transverse section.

FIG. 11 shows details of a slip ring mounted on the counter-electrode of a 1-torch rotating furnace.

FIG. 12 illustrates in axial section and diagrammatically the putting of a non-consumable electrode into rotation by means of a slip ring in accordance with the invention and animated by an electromagnetic field.

FIG. 13 is a transverse section diagrammatically of FIG. 12.

FIG. 14 is a diagrammatical view in longitudinal section of FIG. 12.

Figure 9:
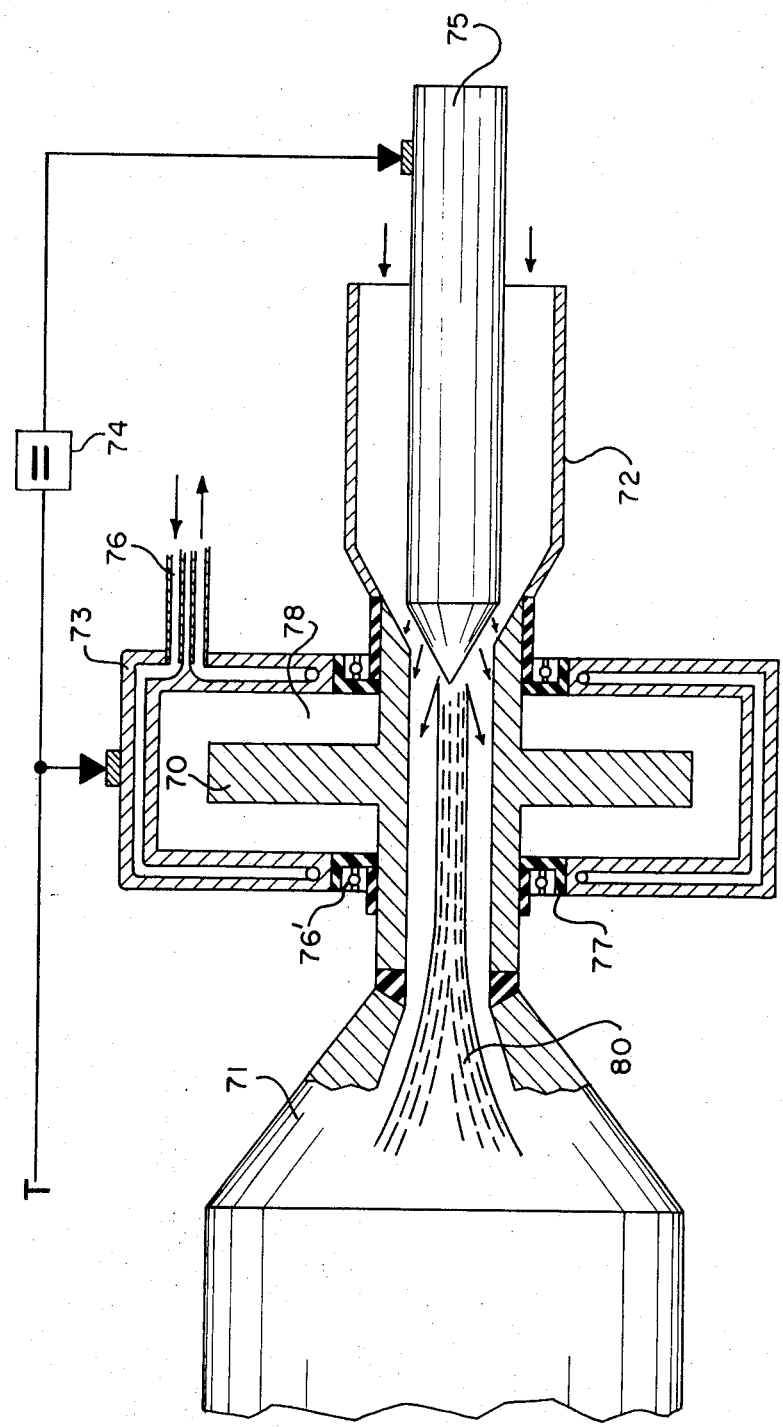
FIG. 9 shows in transverse section a slip ring according to the invention assembled at the aperture of a rotary furnace heated by a plasma column.

FIG. 1 illustrates a movable contact or slip ring 30 and a stationary contact or hub 31 which is hollow and is carried by a hollow axle 32 in communication with the hollow in the disc and around which the movable contact 30 is able to fit rightly and turn freely.

Tightness is obtained by bearing seals 33 assembled in an insulating tube in order to prevent the current passing through bearings 34. The space between the outside wall of the hollow disc 31 and the inside wall of the movable contact 30 is filled with electroconductive liquid 35. The hollow disc or contact 31 has inside and extending transversely across it a baffle 36 in the form of a solid disc centered on the hollow axle and dividing the latter into two compartments 37 and 38 in communication, each with a space separating the edge of the baffle and the inner peripheral wall of the hollow disc. The purpose of the baffle 36 is to divert toward the inside of the periphery of the hollow disc the flow of coolant fluid conveyed by the one axle 32 and taken away by the other axle from the end.

Should there be a slight leakage of electroconductive fluid, the void left can be compensated by moving a finger or pin 40 entering the electroconductive liquid and operated from the outside by a fine threaded screw 41 transversing the wall of the rotating contact 30; this presupposes that the leak has been stopped.

Conversely, the finger 40 movement in the opposite direction is to compensate for increase in volume of electroconductive liquid because of expansion caused by heat which is developed when the slip ring is in use.

The example illustrated in FIG. 2 differs from that shown in FIG. 1 in that the baffle is replaced by a solid central core 42 which is an integral part of the axle 32 so that the space which is filled with the electroconductive liquid 35 is no longer divided into two compartments. The core instead is pierced by a radial passage 43 and 43' respectively to provide inlet and outlet communications for coolant fluid communicated to the parts of the axle 32 in which coiled tubing 44 immersed in the electroconductive liquid surrounds the core.

In the device shown in FIG. 3, the slip ring or movable contact 30 which is in any of the forms of the present invention, is placed between poles 45 and 45' of electromagnetic coil 46 which is energized by electric circuit 47 energized by source 48, so that when rotating the different points of the lateral parts of the slip ring successively transverse in quadrature the magnetic field which is created between the poles. Once the slip ring supplies voltage which is applied and once the slip ring is in motion, the magnetic field 50 combines in accordance with the laws of electromagnetism with the electric current passing the slip ring in the direction shown by the vector 51 of FIGS. 3 and 4 to give rise to forces 52 which act on the electoconductive liquid. The effect of this is to increase the motion of the particles of the latter and improve the coolant effect.

The magnetic field will be at the same frequency and in phase with the current transmitted. The current supplied by the electomagnetic coil is supplied by a source 48 synchronzied by known means with a main source 53.

It goes without saying that the stationary system capable of inducting agitation forces in the electroconductor liquid may be used in place of the electromagnetic system which has just been described.

In a special form of implementation shown in FIG. 5, a separate conduit 54 is placed in the hollow axle and coaxially to it. The conduit is in communication with the most distant compartment 55 of the hollow disc, owing to a central hole 56 of the baffle to which the conduit is fixed by its end. As the compartment has no outlet by the axle, the coolant fluid conveyed in one direction is thus diverted toward the walls of compartment 55, passing into the other compartment 57 after having circulated around the baffle 36 in the opposite direction and is finally sucked out in counterflow through the annular space 58 separated by the axle wall from the central tube.

The current intensities to be transmitted are very high, and it is useful to increase the contact surface between the slip ring and the opposite part (rail or wheel). In that case the rim of the slip is very thin and sufficiently elastic to be able to bend under the pressure of the slip ring against the part.

In FIGS. 7 and 8 this effect is shown since the parts 60 or 61 coming into contact with the slip ring 30 provide a deformed area of the slip ring.

Needless to say, the moving rim is advantageously taking its profiled shape from the shape or the nature of the part of the work with which it must come into contact. It may have a recess or guiding groove over all of the height of its contour, but it can also have a protrusion all along the contour.

Mercury or one or another of the metals or alloys whose melting point is lower than the temperature that can be reached by the slip ring rim may be used as the electroconductive liquid, ensuring the transmission of the electric current between the moving part and the fixed part of the slip ring.

Apart from the alkali metals or the alkaline earth metals or the alloys of either, a whole series of alloys of this kind exists. For example, Wood's metal (alloy) melts at 71°C. and is entirely suitable.

Before using mercury, one must be sure that it will not form an amalgam with the metal with which it comes in contact. As it forms an alloy, then everything with which the mercury will come in contact must have a protective coating.

One field in which the slip ring of the invention may find application is that in which the electric current to be transmitted is utilized with a view to making high temperatures available.

The slip ring of the invention can be replaced by a rotating metal disc, cooled if necessary, utilized as a nonconsumable electrode in the installation described in Belgian Patent No. 410,281. In addition the rotation of the moving part of the slip ring will usefully be effected by electromagnetic induction.

Again, the slip ring of the invention can be used for melting operations in a vacuum or protective atmosphere in melting refractory metals, particularly titanium. In the case in question the cooling of the slip ring in accordance with the invention must be the subject of very special attention from a corrosion point of view. The use of water as a coolant fluid, for example, is not free from trouble. Should the coolant water circuit come in contact with the titanium or other liquid metal contained in the hollow part, there is a risk of explosion, as titanium decomposes water into hydrogen and oxygen. That is why it will be preferable in such a case to choose as a means of cooling the slip ring, mercury or liquid sodium circulating in a closed circuit constituted by the electrode, the axial support and a heat exchanger outside the vessel containing the titanium.

Comparative measurements were taken of I²R losses at the level of the slip ring of the invention and a conventional contact shoe.

With the slip ring of the invention, the voltage drop measured at slip ring level was 0.3 volt with a current of 1240 amperes. With a conventional shoe the voltage drop measured at the shoe level was 0.36 volt at a current of 1200 amperes. That is, in terms of I²R losses, expressed in Kcal:

With the slip ring: 318.2 Kcal
With the conventional shoe: 369.8 Kcal.

In addition, oscillograms recorded during these measurements showed there were no arc formation (sparks) between the rotating drum and the bar, or between the mercury and the inner surface.

Finally, on disassembly of the drum, no pitting was shown on the inner casing.

First Improvement

The basic application describes a process for transmitting electric current between a stationary component and a moving one, characterized in such transmission being assured without friction and with maximum smoothness, by means of an electroconductive liquid joining an outer moving part to an inner fixed part provided with cooling means, the electric current direction going equally well from the fixed part to the moving part or vice versa.

In the special slip rings which are referred to therein, it is always a central part (the coolant system included) which is fixed and the peripheric hollow part which is moving.

It quickly appeared, however, that in numerous applications it would be more advantageous to have the peripheric part fixed, the cental part being associated with the motion of a unit or even set in motion without the assistance of a usual mechanical means (torque transmission).

Thus the sealing problems occurring at the level of the plasma torch feeding rotating furnaces, similar to those in French Patents Nos. 1,405,958 (U.S. Pat. No. 3,403,121) and 1,526,999 (U.S. Pat. No. 3,510,115) functioning at high temperatures, are simplified when the torch nozzles take part in the rotation of the vessel; the seals are then reduced to the sizes of said nozzles which are cooled from the outside through the fixed part of the slip rings.

In addition, in cases where such furnaces are working continuously and in a conditioned atmosphere (for example, oxidizing, reducing, etc.) the volume of the intermediate lock between the torch and the furnace apertures only depends on the need to supply the materials being treated.

Finally, in the case of furnaces with a single torch, with counter-electrode, such as are described in U.S. Pat. No. 3,300,561, the counter-electrode can take the form of a rotating ring, possibly of a conductive refractory oxide compatible with the material to be treated; electrical contact is ensured by a small wheel in accordance with the invention as described at greater length below.

Furthermore, the rotation of the central part, in accordance with the invention, by non-mechanical means can be transmitted to an arc cutting electrode of the type described in German Patent No. 53,678 (Belgian Patent No. 410,281 and U.S. Pats. Nos. 2,355,838 and 2,815,435) or to the non-consumable rotating electrode of an installation of the type described in British Pat. No. 1,240,547 (U.S. Pat. No. 3,420,939), the slip ring ensuring both the rotation of the axle and the transmission of the arc current.

The present invention consists of a special model of slip ring, for the application of the process covered by Belgian Patent application 112,451, the axial part being put into rotation by mechanical or other torque in accordance with special means, the fixed peripheral part receives the electrical current from the outside and transmits it to the axial part by an interposed electroconductive liquid.

In FIG. 9 the central part 70 is part of the same structure as the casing of a rotary furnace 71 indicated diagrammatically and with the venturi 72 of a plasma torch for which it is to serve as a nozzle, the whole being set in rotation by the furnace.

The hollow casing 73 is fixed and in contact with a positive pole of the direct current source 74, the negative pole being connected to a cathode 75 of the torch which is also fixed.

This casing 73 is cooled by internal water circulation, the feeding pipe 76 of which is non-conductive of electricity.

Between the moving part 70 and the fixed part 73 are inserted bearings 76' insulated by non-conductive seals 77, and mercury fills the cavity 78, insuring current transmission between the parts 70 and 73.

The plasma 80 generated in the nozzle spurts directly into the rotary furnace 71.

Figure 10:
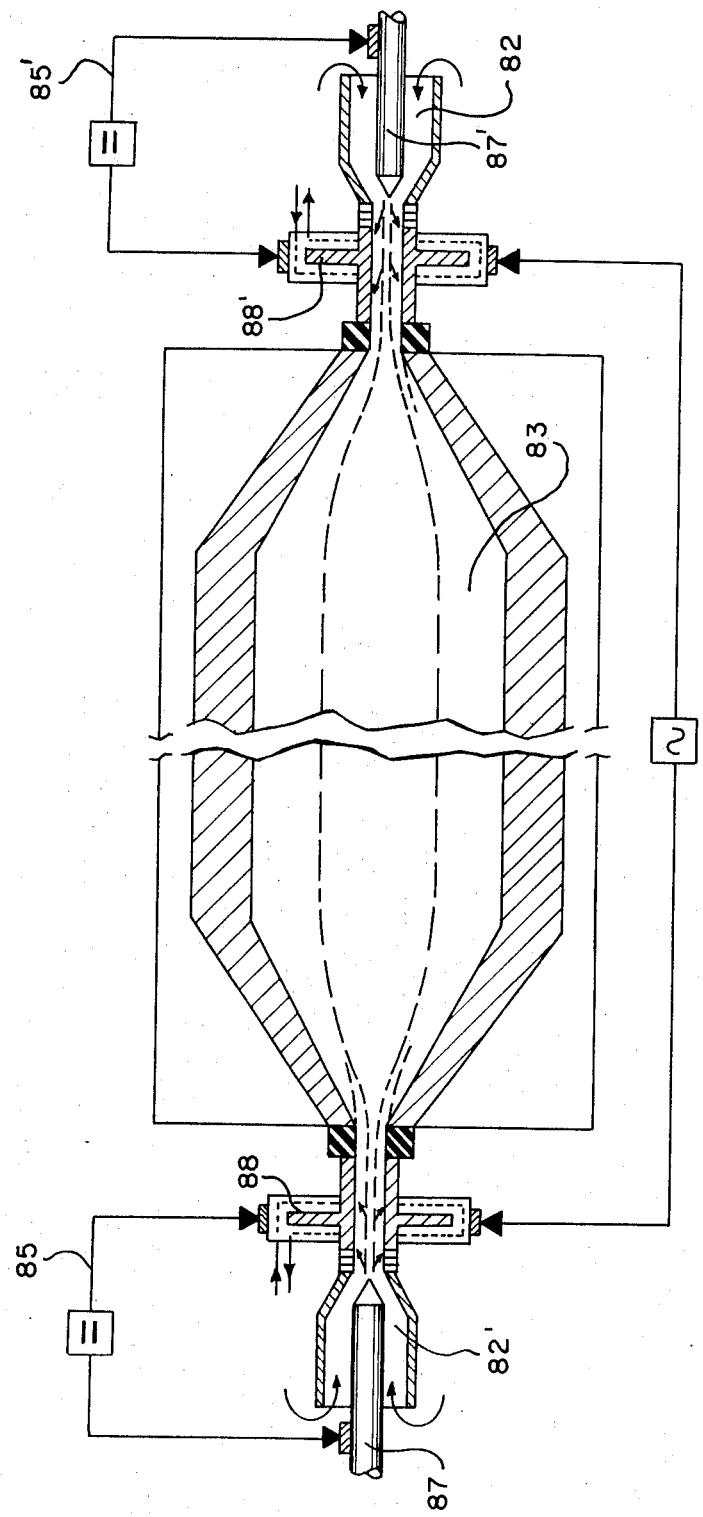
FIG. 10 is an installation diagram of two slip rings in accordance with the present invention at the two extremities of a plasma rotating furnace.

In FIG. 10 the nozzles 82, 82' of the two plasma torches are assembled solid, to the ends of the rotary furnace 83, the driving and rolling members of which are not shown.

A plasma column spurts into the furnace vessel when the electric circuits 85, 85' (pilot currents) and ionization energy current closed between fixed contacts 87 and 87' on the one hand and the rotary nozzles 82 and 82' on the other hand by means of a fixed wheel 88 and 88', plasmagene gas being introduced into the annular space of the torches as shown by the arrows.

FIG. 11 shows in detail the assembly of a slip ring 90 of an electric furnace 91 showing the electric current, the counter electrode of the rotaty furnace of the plasma torch of which is placed at the opposite end (not shown) as in FIG. 2. The seal 92 is as in the preceding figures, an insulating part.

In this case the plasma column can be animated in the furnace vessel by an incorporated electromagnetic field rotating so as to displace the arc impact on the disc of the counter electrode and reduce corrosion of the same.

In FIG. 12 the electrical system is shown at 89, the inner disc 93 of the slip ring is set in rotation by a rotating field affixed by means of electromagnetic windings 94 of the appropriate electrical characteristics and frequency incorporated in the fixed water cooled casing 95 containing the mercury 96.

The integral axle 97 of the disc rotates the insulated bearing 98 and transmits rotation and arc current to the nonconsumable rotating electrode 100 of a fusion furnace 101 (partly shown) similar to that of British Patent No. 1,240,547 (U. S. Pat. No. 3,420,939).

In FIGS. 13 and 14 the same slip ring is simply sketched in at 98, depicts motion of the axle 97 of an arc cutting wheel 100 to an ingot mold 101 (Belgian Patent No. 410,281 and U. S. Pat. No. 2,007,225).

Second Improvement

In the basic application it is disclosed that it is possible to utilize the slip ring as a non-consumable electrode in a furnace, in a vacuum or inert atmosphere, in the fusion of metals and in particular of titanium according to British Patent No. 1,240,547 (U.S. Pat. No. 3,420,939).

However, taking into account the danger of explosion, reservations are made and it is recommended to use a liquid metal such as mercury or liquid sodium as a coolant.

The present invention constitutes a noteworthy improvement on a slip ring, bearing in mind these limitations. It is particularly important for fusion equipment, in a vacuum or controlled atmosphere, particularly under reduced pressure, and in which such a slip ring is utilized as a non-consumable electrode.

The said improved slip ring is characterized by the fact that the liquid metal is put in circulation and simultaneously ensures:

1. A spin of the hollow cylinder constitutes the periphery of the slip ring by action of a liquid metal on the fins fitted inside the hollow cylinder.
2. The electric contact between the fixed center part and the rotating hollow cylinder.
3. The cooling of the rotating hollow cylinder.

The equipment comprises:
   a. Circuit transversed by the liquid metal outside the furnace proper with a pump, heat exchanger, fixed contact for current input and adequate current sources.
   b. The furnace proper with a slip ring, a fixed connection at the outside circuit transversed by the liquid metal and all the necessary known means such as cooled ingot mold, return of current to earth, supply of material to be melted, supply of inert gas, and means for holding the vessel below atmospheric pressure.

Figure 15:
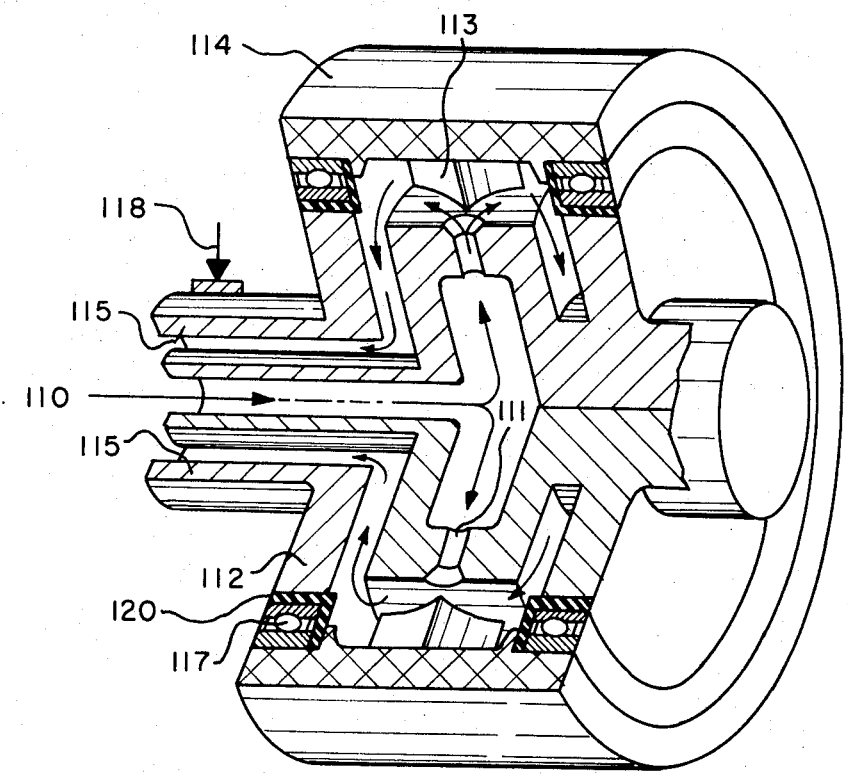
FIG. 15 is a perspective of a slip ring according to the invention in two-plane section containing the axis.

FIG. 15 is a view of the structure of the invention in which mercury or other conducting liquid is introduced under pressure by the axial tube 110 and distributed by the injectors 111 over the center part 112 to the fins 113 which are integral with the movable housing 114. Under the action of the mercury flow this part is set spinning. The mercury is returned by the evacuation ring 115 coaxial to the axial tube 110.

It is important to note that the center part identified by numbers 110, 115, 112 is not rotating; the only mobile part 114 is free on the shaft 115 through the bearings 117. Current is fed in at 118 through fixed shaft 115, the bearings 117 being electrically insulated at 120 from shaft 115.

Figure 16:
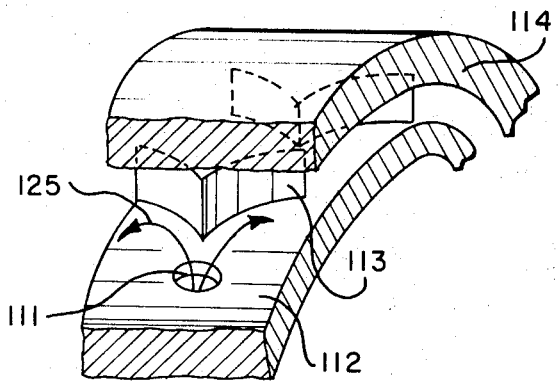
FIG. 16 is a fragmentary sectional perspective of the fins.
Figure 17:
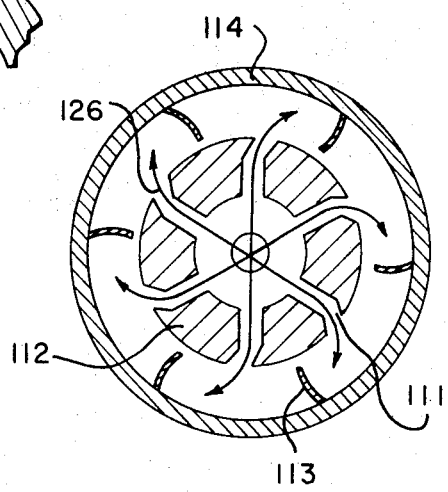
FIG. 17 is a section transverse to the axis showing the fins.

FIGS. 16 and 17 show an arrangement of fins 113 and injector nozzles 111 of a mercury mini-turbine, in which the mercury streams are 125 and 126.

Figure 18:
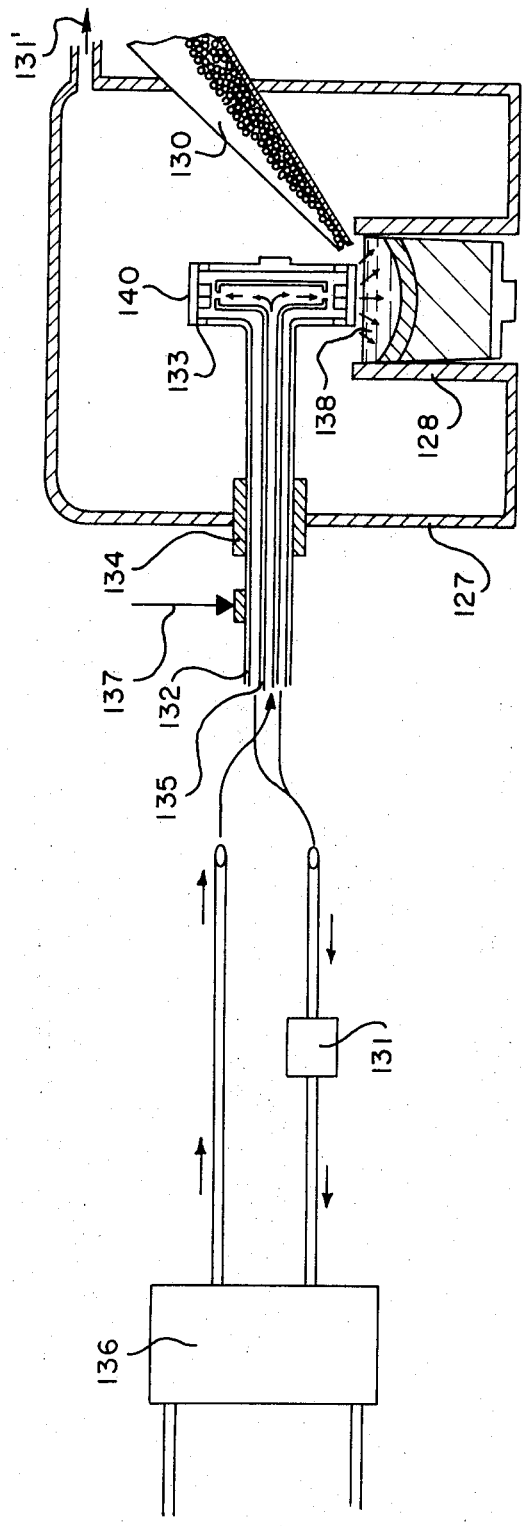
FIG. 18 is an axial section with a diagrammatic illustration of the circulation of a furnace according to the invention.

The circuitry of the equipment is sketched in FIG. 18. The vessel of the furnace 127 is shown schematically as well as the ingot mold 128, the hopper 130 supplying the metal to be melted and the vessel conditioning pump 131'.

Passing shaft 132 of the slip ring electrode 133 is sealed bearing 134 greatly simplified, as this shaft is not rotating. It will, therefore, be particularly easy to make it electrically insulated and perfectly tight at 134. The liquid is put into circulation by the pump 131' to ensure rotation of the slip ring since inner tube 135 is made to rotate, as explained in FIGS. 15, 16, 17. The conductor liquid is cooled by heat exchanger 136. The electric current is fed to fixed shaft 132 at 137 by jaws which are fixed mechanically or brazed into shaft 132.

Arc 138 is struck by known means, for instance a high frequency pilot discharge between cylindrical surface 140 and the molten metal in the metal pool in the ingot mold 128. The outer flow of the conductive liquid is from shaft 132 to pump 131 and heat exchanger 136 which is at the potential of the slip ring electrode insulated from the ground. However, there is no problem as the voltages used are relatively low and generally less than 1,000 volts.

In view of our invention and disclosure, variations and modifications to meet individual whim or particular need will doubtless become evident to others skilled in the art to obtain all or part of the benefits of our invention without copying the process and apparatus shown, and we, therefore, claim all such insofar as they fall within the reasonable spirit and scope of our claims.

Having thus described our invention, what we claim as new and desire to secure by Letters Patent is:

1. Contact roller comprising two coaxial parts, one rotatable freely around a common axis and the other stationary, and having a space between them and walls closing off the space between the rotatable member and the stationary member to form a hollow gap, means filling the hollow gap with a conductive liquid under pressure, means for circulating a cooling liquid through the stationary part, the roller being able to transmit, with a maximum flexibility and a minimum friction, electric current between the two coaxial parts, the roller being in rotation or translation in a circuit in which it is introduced, the stationary portion consisting of a hollow axial part around which the movable part can rotate, said hollow axial part consisting of a cylinder occupying the major portion of the internal space of the movable annular piece centered on hollow tubular elements permitting the supply of cooling liquid around the center portion, the hollow cylinder in the fixed portion being provided with a flat disc in the center of the symmetrical section and leaving the periphery free to form a baffle to throw back the cooling liquid toward the cylindrical surface of the center portion.

2. Contact roller comprising two coaxial parts, one rotatable freely around a common axis and the other stationary, and having a space between them and walls closing off the space between the rotatable member and the stationary member to form a hollow gap, means filling the hollow gap with a conductive liquid under pressure, means circulating a cooling liquid through the stationary part, the roller being able to transmit, with a maximum flexibility and a minimum friction, electric current between the two coaxial parts, the roller being in rotation or translation in the circuit in which the contact is connected, means for subjecting the contact to pressure against a surface and means for relatively translating the contact with respect to the surface.

3. Contact roller comprising two coaxial parts, one rotatable freely around a common axis and the other stationary, and having a space between them and walls closing off the space around the rotatable member and the stationary member to form a hollow gap, means filling the hollow gap with a conductive liquid under pressure, means for circulating a cooling liquid through the stationary part, the roller being able to transmit, with a maximum flexibility and a minimum friction, electric current between the two coaxial parts, the roller being in rotation or translation in a circuit in which it is introduced, plus an external circuit to which the roller is connected and means for subjecting the electroconductive liquid in the roller to a transverse magnetic field through the action of a horseshoe type electric magnet external to the roller to agitate the conductive liquid.

4. Contact roller comprising two coaxial parts, one rotatable freely around a common axis and the other stationary, and having a space between them and walls closing off the space between the rotatable member and the stationary member to form a gap, means filling the hollow gap with a conductive liquid under pressure, means for circulating a cooling liquid through the stationary part, the roller being able to transmit with a maximum flexibility and a minimum friction, electric current between the two coaxial parts, the roller being in rotation or translation in a circuit in which it is introduced, in which one part rotates freely about the common axis and the other is stationary, separated by a hollow space, the stationary portion being a hollow cylinder perforated with apertures and centered on the end of a hollow axial tubular member, the movable portion being cylindrically mounted on the common axis and provided with blades on its internal cylindrical surface, in combination with means for forcing circulation of the electroconductive liquid, there being means for external cooling of the electroconductive liquid, the electroconductive liquid being pumped through the tubular element in the axis, the internal stationary cylinder, the apertures, the hollow interannular space and through the space around the center tubular element, the movable cylinder being rotated by the flow of electroconductive liquid striking against the blades.

5. Contact roller of claim 4, in combination with means for arc cutting of the surface of the external part.

* * * * *